US009435935B2

United States Patent
Zhou

(10) Patent No.: US 9,435,935 B2
(45) Date of Patent: Sep. 6, 2016

(54) LIGHT GUIDE PLATE, BACKLIGHT MODULE AND DISPLAY DEVICE

(71) Applicant: BOE TECHNOLOGY GROUP CO., LTD., Beijing (CN)

(72) Inventor: Shanshan Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 27 days.

(21) Appl. No.: 14/079,832

(22) Filed: Nov. 14, 2013

(65) Prior Publication Data

US 2014/0133184 A1    May 15, 2014

(30) Foreign Application Priority Data

Nov. 15, 2012    (CN) .......................... 2012 1 0460769

(51) Int. Cl.
*F21V 8/00*    (2006.01)

(52) U.S. Cl.
CPC ........... *G02B 6/0061* (2013.01); *G02B 6/0038* (2013.01); *G02B 6/0068* (2013.01)

(58) Field of Classification Search
CPC .. G02B 6/0016; G02B 6/002; G02B 6/0068; G02B 6/0038; G02B 6/0021; G02B 6/0061; G02B 6/00021; G02B 6/0018; G02F 1/133615
USPC ................................ 362/97.1–97.3, 615–623
See application file for complete search history.

(56) References Cited

U.S. PATENT DOCUMENTS

| | | | | |
|---|---|---|---|---|
| 7,602,559 B2* | 10/2009 | Jang | .......................... | F21V 5/04 359/726 |
| 7,703,973 B2* | 4/2010 | Zhu | ...................... | G02B 6/0018 362/297 |
| 7,946,746 B2* | 5/2011 | Hsieh | ................... | G02B 6/0078 362/602 |
| 2005/0152141 A1* | 7/2005 | Suzuki | .......................... | 362/241 |
| 2006/0164839 A1* | 7/2006 | Stefanov | ....................... | 362/327 |
| 2007/0147023 A1* | 6/2007 | Matsushita | ..................... | 362/97 |
| 2010/0220484 A1* | 9/2010 | Shani | ..................... | G02B 5/021 362/296.09 |
| 2011/0090672 A1* | 4/2011 | Zhu | ...................... | G02B 6/0018 362/97.1 |

FOREIGN PATENT DOCUMENTS

CN    102042562 A    5/2011

OTHER PUBLICATIONS

Chinese Rejection Decision dated Mar. 6, 2015; Appln. No. 201210460769.2.
Third Chinese Office Action dated Oct. 15, 2014; Appln. No. 201210460769.2.
First Chinese Office Action dated Aug. 14, 2013; Appln. No. 201210460769.2.
Second Chinese Office Action dated May 5, 2014; Appln. No. 201210460769.2.

* cited by examiner

*Primary Examiner* — Anh Mai
*Assistant Examiner* — Arman B Fallahkhair
(74) *Attorney, Agent, or Firm* — Ladas & Parry LLP

(57) ABSTRACT

A light guide plate for the edge-lit backlight module comprises a first recessed portion and a second recessed portion. The first recessed portion is provided at the bottom of a light incident end of the light guide plate for accommodating a light source. The second recessed portion is provided at the top of the light incident end of the light guide plate, corresponding to the first recessed portion.

12 Claims, 4 Drawing Sheets

US 9,435,935 B2

LIGHT GUIDE PLATE, BACKLIGHT MODULE AND DISPLAY DEVICE

FIELD OF THE INVENTION

Embodiments of the invention relate to a light guide plate, a backlight module and a display device

BACKGROUND

In a liquid crystal display (LCD), the liquid crystal panel itself does not emit light, thus requiring a separate backlight module to provide light for display. Edge-lit backlight module generally consists of parts such as light sources, reflectors, a light guide plate and a back plate.

In an edge-lit backlight module, light emitted from light sources at one side of the light guide plate directly enters into the light guide plate and travels to the opposite side of the light guide plate. When light strikes the surface of a diffusing point it bounces off in all directions and then exits the light guide plate from its light exiting surface. The light guide plate mainly functions to convert the incident light into planar light. The planar light from the light guide plate is then diffused and deflected, and finally gathered and adjusted in the direction normal to the display plane by two converging prism sheets having continuous zigzag-shaped groove surfaces.

Light emitting diode (LED) is commonly adopted as the light source in an edge-lit backlight module. Since a LED has a certain light emitting angle, fewer LEDs generally leads to uneven brightness at the light incident side, i.e., hot spots, and thus result in an uneven overall brightness of the backlight module.

SUMMARY

An embodiment of the present invention provides a light guide plate for the edge-lit backlight module comprising a first recessed portion and a second recessed portion, wherein the first recessed portion is provided at the bottom of a light incident end of the light guide plate for accommodating a light source, and the second recessed portion is provided at the top of a light incident end of the light guide plate, corresponding to the first recessed portion.

In an example, a spherical cap structure is provided at the bottom surface of the first recessed portion.

In an example, the second recessed portion is a cone having an apex adjacent to the first recessed portion and a base parallel to a bottom surface of the light guide plate.

In an example, the second recessed portion is a cone having an apex adjacent to the apex of the spherical cap structure at the bottom surface of the first recessed portion.

In an example, the base of the second recessed portion has a radius larger than or equal to the radius of the spherical cap structure at the bottom surface of the first recessed portion.

In an example, the light source is a light emitting diode light source.

In an example, the thickness of the light emitting diode light source is 0.4 mm to 1.2 mm.

In an example, the light guide plate has a thickness of 4 mm to 8 mm.

In an example, the first recessed portion is formed to have an accommodation space larger than the volume of a light source to be located.

Another embodiment of the present invention provides a backlight module including the light guide plate according to claim 1.

A further embodiment of the present invention provides a display device including the backlight module according to claim 10.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

One of the technical problems to be solved by the embodiments of the present invention is to provide a light guide plate, a backlight module and a display device capable of improving the brightness uniformity.

Figure 1:
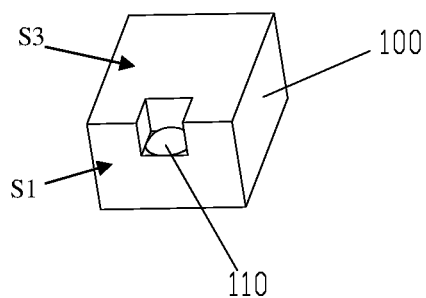
FIG. 1 is a schematic perspective view of a light guide plate according to an embodiment of the present invention.
Figure 2:
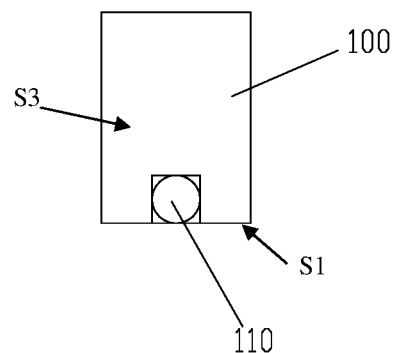
FIG. 2 is a schematic bottom view of a light guide plate according to the embodiment of the present invention.
Figure 3:
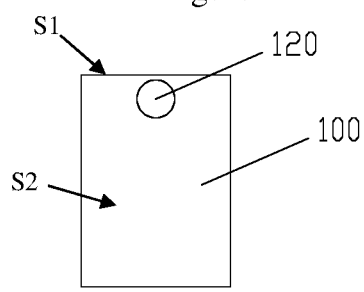
FIG. 3 is a schematic top view of a light guide plate according to the embodiment of the present invention.

FIGS. 1 through 3 are a schematic perspective view, a schematic bottom view and a schematic top view of a light guide plate according to an embodiment of the present invention respectively. Referring to FIGS. 1 through 3, according to the embodiment of the present invention, a first recessed portion 110 is disposed at the bottom of the light incident end S1 of the light guide plate 100 so as to accommodate a light source (not shown) for example, such as an LED light source; a second recessed portion 120 is disposed at the top of the light incident end S1 of the light guide plate 100, corresponding to the first recessed portion 110. The light guide plate has a light incident surface S1 at the light incident end, a light exit surface S2 perpendicular to the light incident surface S2, and a third surface S3 perpendicular to the light incident surface S1 and opposite to the light exit surface S2. The first recessed portion 110 is formed at the light incident surface S1 and the third surface S3, and the second recessed portion 120 is formed at the light exit surface S2.

In an example, the first recessed portion 110 is formed to have an accommodation space larger than the volume of the light source to be located.

In an example, the surface of the first recessed portion closest to the top surface of the light guide plate 110 (hereinafter referred to as the bottom surface of the first recessed portion) is formed to have a spherical cap structure for converging light emitted from the light source. In another example, the surface of the first recessed portion 110 closest to the top surface of the light guide plate 100 can be formed to have a light converging structure of other shapes such as ellipsoidal surface structure.

In an example, the second recessed portion 120 is a cone with a vertex adjacent to the first recessed portion 110 and a base parallel to the bottom surface of the light guide plate 100. At the light incident end of the light guide plate, the curved surface (conical surface) of the cone is capable of reflecting the light in all directions after passing through the light converging structure at the bottom surface of the first recessed portion 110, so that the brightness uniformity at the light incident end of the light guide plate and the brightness uniformity of the whole light guide plate are improved.

In an example, the circular base of the conical second recessed portion 120 has a radius larger than or equal to the radius of the spherical cap structure at the bottom surface of the first recessed portion 110. After passing through the spherical cap structure at the bottom surface of the first recessed portion 110, the light can be sufficiently reflected by the conical surface of the conical second recessed portion 120.

For example, the light guide plate 100 is made of polyethylene terephthalate (PET) and has a thickness of 4 mm to 8 mm. In the embodiments of the present invention, the material of the light guide plate is not limited thereto; other known materials suitable for the light guide plate can also be adopted.

For example, the thickness of the LED light source is 0.4 mm to 1.2 mm.

Figure 4A:
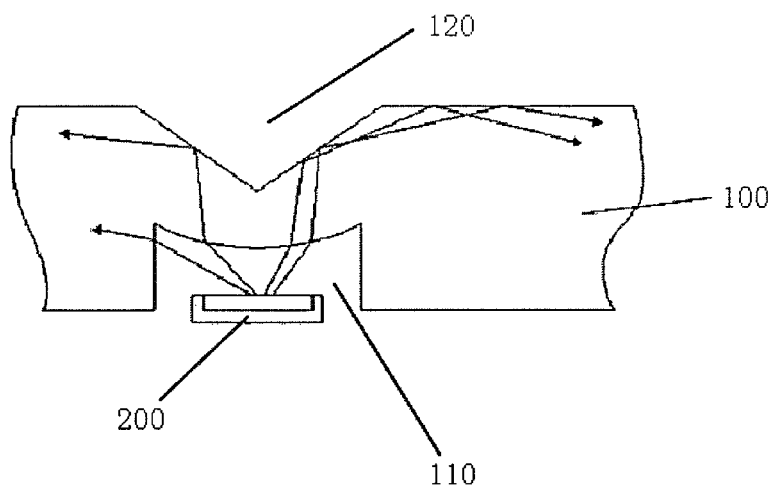
FIG. 4a is a partial schematic view showing paths of light when it strikes the first and the second recessed portions of the light guide plate according to an embodiment of the present invention.
Figure 4B:
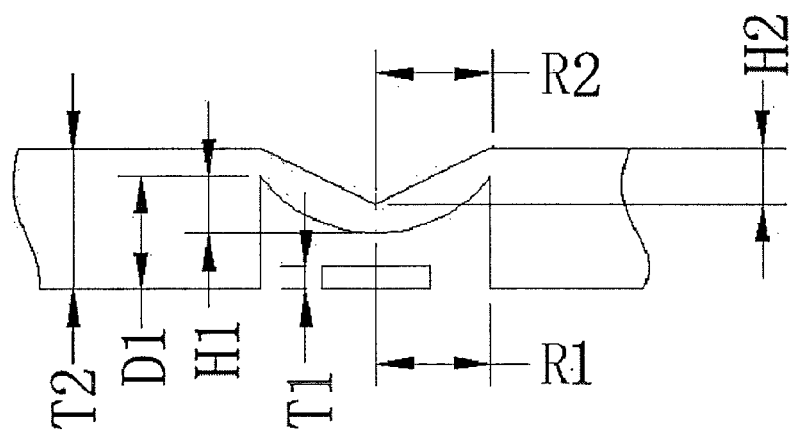
FIG. 4b is a partially schematic side view showing the light incident end of the light guide plate according to an embodiment of the invention.

FIG. 4a is a partial schematic view showing paths of light when it strikes the first and the second recessed portions of the light guide plate according to an embodiment of the present invention. FIG. 4b is a partially schematic side view showing the light incident end S1 of the light guide plate according to an embodiment of the invention. Referring to FIG. 4a and FIG. 4b, the bottom surface of the first recessed portion to 110 is a spherical cap which actually functions as a light converging structure such as a convex lens. For example, the radius of the sphere where the spherical cap lies in is 5 mm, height H1 of the spherical cap is 2 mm, and the radius of the circular base R1 of the spherical cap is 4 mm. The distance D1 between the deepest portion of the first groove 110 and the bottom surface of the light guide plate 100 is 4 mm. The conical second recessed portion 120 has a radius of the bottom circle R2 of 4 mm and a height H2 of 2 mm. The thickness T2 of the light guide plate 100 is 5 mm. The light source 200 adopts a LED light source with a thickness T1 of 0.8 mm.

The radius of the circular base R1 of the spherical cap and the radius of the bottom circle R2 of the conical second recessed portion can be adjusted according to practical application. In an example, the radius of the circular base R1 of the spherical cap is larger than or equal to the radius of the bottom circle R2 of the conical second recessed portion.

Referring to FIG. 4a, when the LED light source 200 is put into in the first recessed portion 110 of the light guide plate 100 according to the embodiment of the present invention, the light emitted from the light source 200 arrives at the conical second recessed portion 120 after passing through the converging spherical cap of the first groove 110; then the light is reflected by the conical second recessed portion 120 so as to be sufficiently mixed inside the light guide plate. As a result, the problems such as hotspots and the uneven brightness are solved, although the LED light source 200 has a certain light divergence angle. In the case that a decreased number of LED light sources are adopted, under the action of the first recessed portion 110 and the second recessed portion 120, light emitted from the LED light sources can be reflected inside the light guide plate 100 rather than refracted out of the light guide plate 100, thus improving brightness uniformity.

In an example, the apex angle of the second recessed portion 120 can ranges from 125° to 130°. The apex angle of the second recessed portion 120 can be adjusted according to the size of the light guide plate 100.

Figure 5A:
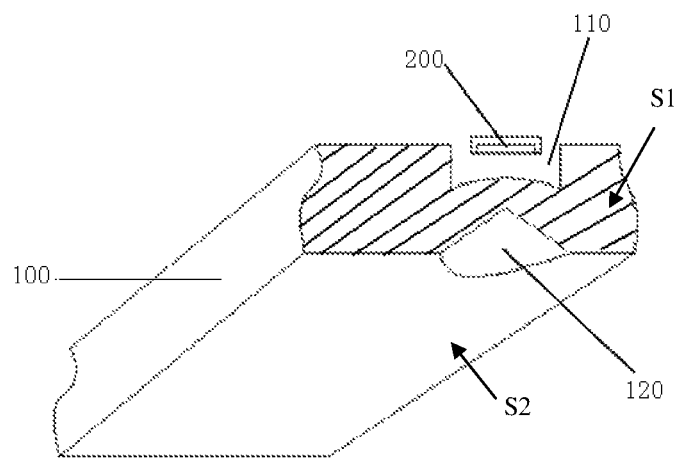
FIGS. 5a and 5b are schematic diagram showing a positional relationship of the light guide plate and light sources according to an embodiment of the present invention.
Figure 5B:
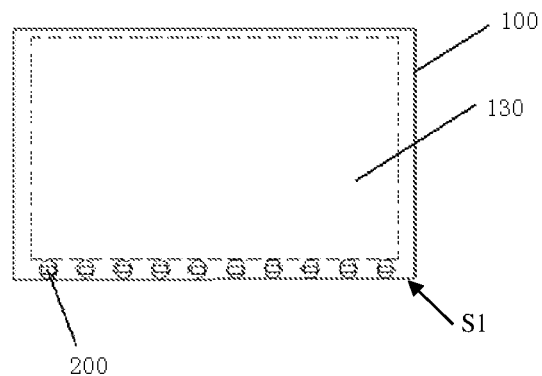

Referring to FIGS. 5a and 5b, a plurality of light sources 200 are housed in a plurality of the first recessed portions 110 respectively; and the plurality of light sources 200 are disposed at at least one side of the display area 130 of the light guide plate 100.

Figure 6A:
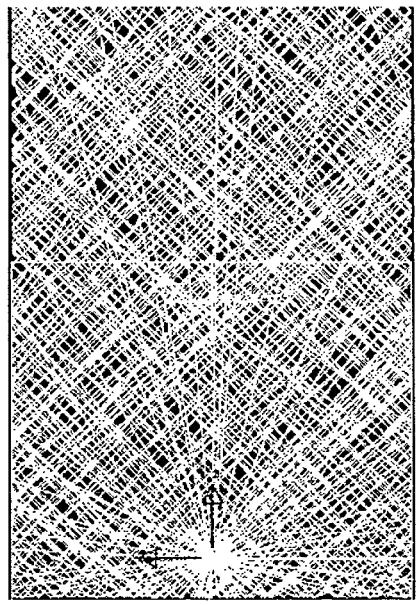
FIG. 6a is a schematic diagram illustrating the overall optical paths generated in a region of the light guide plate according to an embodiment of the present invention corresponding to one LED light source.
Figure 6B:
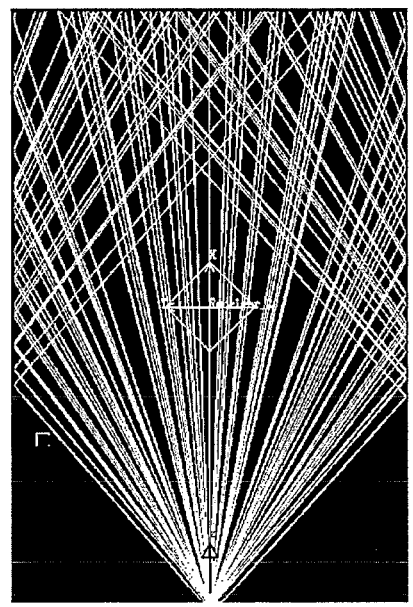
FIG. 6b is a schematic diagram illustrating the overall optical paths generated in a region of an existing light guide plate corresponding to one LED light source.

FIG. 6a is a schematic diagram illustrating the overall optical paths generated in a region of the light guide plate 100 according to an embodiment of the present invention corresponding to one LED light source 200; FIG. 6b is a schematic diagram illustrating the overall optical paths generated in a region of an existing light guide plate corresponding to one LED light source.

Referring to FIGS. 6a and 6b, the optical paths formed in the light guide plate according to the embodiment of the present invention is more evenly distributed, without significant luminance difference between the end of the light guide plate near the LED light source and the end of the light guide plate away from the LED light source. However, the optical paths formed in the existing light guide plate is unevenly distributed, with significant luminance difference between the end of the light guide plate near the LED light source and the end of the light guide plate away from the LED light source. That is, a region of the existing light guide plate adjacent to the LED light source is brighter than a region of the existing light guide plate away from the LED light source. In addition, brightness of the regions at two sides of the LED light source decreases rapidly, thus resulting in hot spots. In can be seen that the light guide plate according to the embodiments of the present invention can achieve a uniform brightness distribution so as to improve the uniformity of the light exiting therefrom and prevent the hot spots. In addition, compared with an existing light guide plate, the intensity of the light exiting from the light guide plate according to the embodiment of the present invention is enhanced due to the effective utilization of light.

An embodiment of the present invention further provides an edge-lit backlight module including the light guide plate according to the above described embodiments of the present invention. The backlight module can also include a light source, a reflector film, a diffuser film and a back plate.

An embodiment of the present invention further provides a display device including the backlight module according to the above described embodiment. An example of the display device is a liquid crystal display device such as a LCD television, a computer monitor, a tablet PC. The liquid crystal display device includes a liquid crystal display panel, wherein a TFT array substrate and a counter substrate opposite to each other are bonded to form a liquid crystal cell, and the liquid crystal cell is filled with the liquid crystal material. The counter substrate is for example a color filter substrate. The pixel electrode of each pixel unit of the TFT array substrate is used for applying an electric field to control the rotation of the liquid crystal material, thus performing display operation.

In the light guide plate, the backlight module and the display device according to the embodiments of the present invention, due to the first recessed portion at the bottom of the light incident end of the light guide plate and the second recessed portion, corresponding to the first recessed portion, at the top of the light incident end of the light guide plate, the light emitted form the light sources is reflected by the second recessed portion after passing through the bottom surface of the first recessed portion, thereby sufficiently mixed inside the light guide plate. Therefore, hot spots and uneven brightness can be prevented. In addition, a decreased number of LED light source can be adopted to obtain acceptable brightness uniformity.

Although the present invention has been described in considerable detail with reference to preferred embodiments thereof, some modifications or improvements can also be made on the basis of the present invention, which is evident to those skilled in the art. Therefore, those modifications or improvements, which are made without departing from the spirit of the present invention, all belong to the protection scope of the present invention.

What is claimed is:

1. A light guide plate for an edge-lit backlight module comprises a first recessed portion and a second recessed portion, wherein the first recessed portion is provided at a bottom of a light incident end of the light guide plate for accommodating a light source, and the second recessed portion is provided at a top of the light incident end of the light guide plate, corresponding to the first recessed portion, the light guide plate has a light incident surface at the light incident end, a light exit surface perpendicular to the light incident surface and a third surface perpendicular to the light incident surface and opposite to the light exit surface, the first recessed portion is formed at the light incident surface and the third surface, and the second recessed portion is formed at the light exit surface,
wherein, in a direction perpendicular to the light exit surface, a sum of a depth of the first recessed portion and a depth of the second recessed portion is larger than a maximal thickness of the light guide plate.

2. The light guide plate of claim 1, wherein a light converging structure is provided at a bottom surface of the first recessed portion.

3. The light guide plate of claim 2, wherein the light converging structure is a spherical cap structure.

4. The light guide plate of claim 3, wherein the second recessed portion is a cone having an apex adjacent to the apex of the spherical cap structure at the bottom surface of the first recessed portion.

5. The light guide plate of claim 4, wherein the base of the second recessed portion has a radius larger than or equal to a radius of the spherical cap structure at the bottom surface of the first recessed portion.

6. The light guide plate of claim 1, wherein the light source is a light emitting diode light source.

7. The light guide plate of claim 6, wherein the thickness of the light emitting diode light source is 0.4 mm to 1.2 mm, the light guide plate has a thickness of 4 mm to 8 mm, the second recessed portion is a cone having an apex adjacent to the first recessed portion and a base parallel to a bottom surface of the light guide plate, an apex angle of the second recessed portion ranges from 125° to 130°.

8. A backlight module including the light guide plate according to claim 1.

9. A display device including the backlight module according to claim 8.

10. The light guide plate of claim 1, wherein the second recessed portion is a cone having an apex adjacent to the first recessed portion and a base parallel to a bottom surface of the light guide plate.

11. The light guide plate of claim 1, wherein the first recessed portion is formed to have an accommodation space larger than the volume of a light source to be located.

12. The light guide plate of claim 1, wherein, the second recessed portion is further formed at the light incident surface.

* * * * *